United States Patent

Lerner

Patent Number: 5,931,547
Date of Patent: Aug. 3, 1999

[54] ANTI-COLLISION SYSTEM

[76] Inventor: Meir Yisochor Lerner, 575 Kent Ave. #3, Brooklyn, N.Y. 11211

[21] Appl. No.: 08/812,338

[22] Filed: Mar. 5, 1997

[51] Int. Cl.$^6$ ........................................................ B60T 8/32
[52] U.S. Cl. .............................................. 303/193; 303/3
[58] Field of Search ..................................... 303/193, 125, 303/3; 180/169; 188/156; 73/128, 129, 132

[56] References Cited

U.S. PATENT DOCUMENTS

| | | | |
|---|---|---|---|
| 3,898,913 | 8/1975 | Hendrickson et al. | 91/31 |
| 4,428,620 | 1/1984 | Warwick et al. | 303/3 |
| 4,941,553 | 7/1990 | Harrison | 188/156 |
| 5,314,037 | 5/1994 | Shaw et al. | 180/169 |
| 5,388,048 | 2/1995 | Yavnayi et al. | 364/461 |
| 5,447,363 | 9/1995 | Fukamachi | 303/125 |

Primary Examiner—Robert Oberleitner
Assistant Examiner—Melanie Torres

[57] ABSTRACT

A new Anti-Collision System for providing an audible warning to a vehicle operator indicating that the collision time to an obstacle located ahead of the vehicle is less than a pre-determined warning time and for providing a braking pressure to the vehicle's hydraulic fluid braking system upon the condition that the collision time is less than a pre-determined danger time and that the vehicle brake pressure is under a pre-determined brake pressure limit. The inventive device includes a laser rangefinder mountable upon a front side of the vehicle for generating a first electronic signal, a digital speedometer for generating a second electronic signal, a microcontroller for processing the first electronic signal to determine the distance between the vehicle and an obstacle located in front of the vehicle and for processing the second electronic signal to determine the self-speed of the vehicle, an audible alarm functionally connected to the microcontroller for producing an alarm upon the receipt of an alarm signal from the microcontroller and a braking system including a solenoid driven, spring biased piston disposed within a sealed hydraulic fluid reservoir functionally connected to the controller for applying a braking force to the vehicle upon the receipt of a braking signal from the microcontroller.

8 Claims, 4 Drawing Sheets

FIG.1
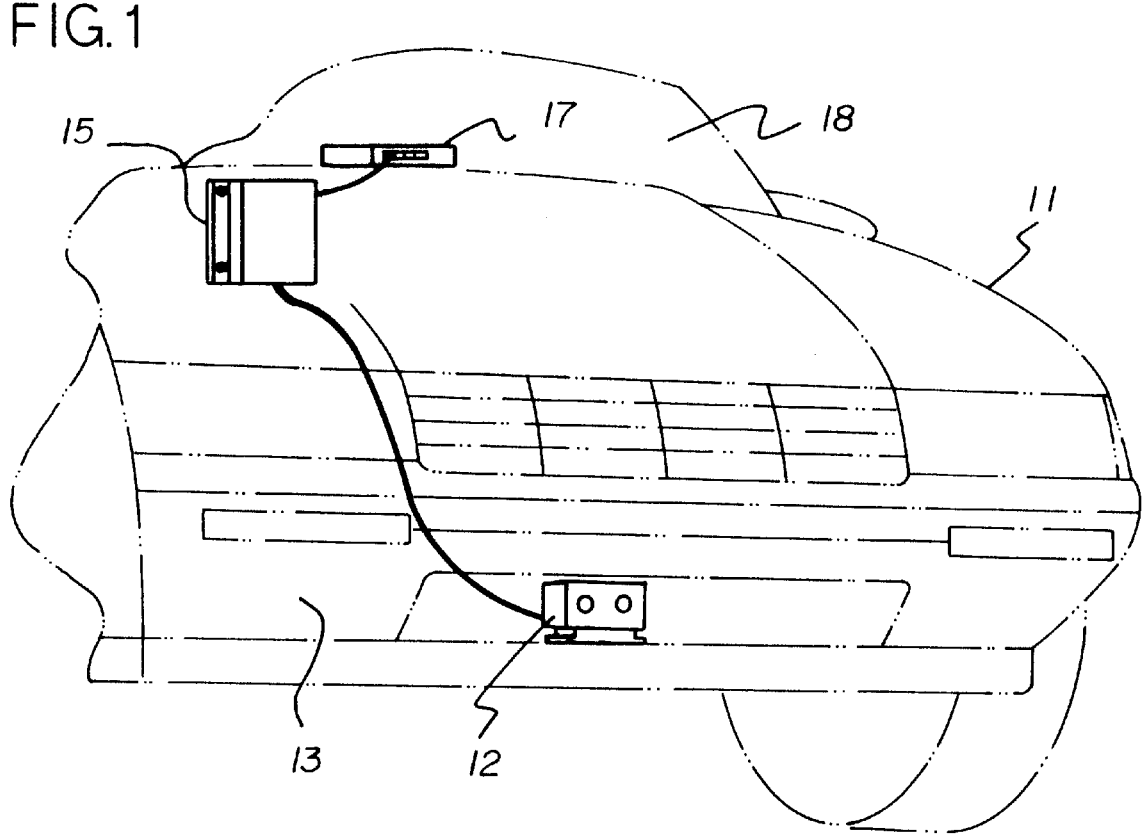
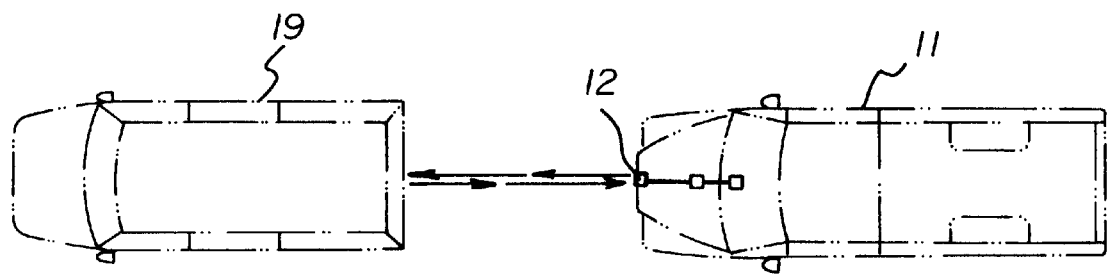
FIG.2

ANTI-COLLISION SYSTEM

BACKGROUND OF THE INVENTION

1. Field of the Invention

The present invention relates to vehicle anti-collision systems and more particularly pertains to a new Anti-Collision System for providing an audible warning to a vehicle operator indicating that the collision time to an obstacle located ahead of the vehicle is less than a pre-determined warning time and for providing a braking pressure to the vehicle's hydraulic fluid braking system upon the condition that the collision time is less than a pre-determined danger time and that the vehicle brake pressure is under a pre-determined brake pressure limit.

2. Description of the Prior Art

The use of vehicle anti-collision systems is known in the prior art. More specifically, vehicle anti-collision systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle anti-collision systems include U.S. Pat. No. 5,388,048; U.S. Pat. No. 5,432,509; U.S. Pat. No. 5,314,037; U.S. Pat. No. 5,355,118; U.S. Pat. No. 5,357,438 and U.S. Pat. No. Des. 282,725.

While these devices fulfill their respective, particular objectives and requirements, the aforementioned patents do not disclose a new Anti-Collision System. The inventive device includes a laser rangefinder mountable upon a front side of the vehicle for generating a first electronic signal, a self-speed determining means for generating a second electronic signal, a microcontroller for processing the first electronic signal to determine the distance between the vehicle and an obstacle located in front of the vehicle and for processing the second electronic signal to determine the self-speed of the vehicle, an alarm means functionally connected to the microcontroller for producing an alarm upon the receipt of an alarm signal from the microcontroller and a braking means functionally connected to the controller for applying a braking force to the vehicle upon the receipt of a braking signal from the microcontroller.

In these respects, the Anti-Collision System according to the present invention substantially departs from the conventional concepts and designs of the prior art, and in so doing provides an apparatus primarily developed for the purpose of providing an audible warning to a vehicle operator indicating that the collision time to an obstacle located ahead of the vehicle is less than a pre-determined warning time and for providing a braking pressure to the vehicle's hydraulic fluid braking system upon the condition that the collision time is less than a pre-determined danger time and that the vehicle brake pressure is under a pre-determined brake pressure limit.

SUMMARY OF THE INVENTION

In view of the foregoing disadvantages inherent in the known types of vehicle anti-collision systems now present in the prior art, the present invention provides a new Anti-Collision System construction wherein the same can be utilized for providing an audible warning to a vehicle operator indicating that the collision time to an obstacle located ahead of the vehicle is less than a pre-determined warning time and for providing a braking pressure to the vehicle's hydraulic fluid braking system upon the condition that the collision time is less than a pre-determined danger time and that the vehicle brake pressure is under a pre-determined brake pressure limit.

The general purpose of the present invention, which will be described subsequently in greater detail, is to provide a new Anti-Collision System apparatus and method which has many of the advantages of the vehicle anti-collision systems mentioned heretofore and many novel features that result in a new Anti-Collision System which is not anticipated, rendered obvious, suggested, or even implied by any of the prior art vehicle anti-collision systems, either alone or in any combination thereof.

To attain this, the present invention generally comprises a laser rangefinder mountable upon a front side of the vehicle for generating a first electronic signal, a self-speed determining means for generating a second electronic signal, a microcontroller for processing the first electronic signal to determine the distance between the vehicle and an obstacle located in front of the vehicle and for processing the second electronic signal to determine the self-speed of the vehicle, an alarm means functionally connected to the microcontroller for producing an alarm upon the receipt of an alarm signal from the microcontroller and a braking means functionally connected to the controller for applying a braking force to the vehicle upon the receipt of a braking signal from the microcontroller.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Anti-Collision System apparatus and method which has many of the advantages of the vehicle anti-collision systems mentioned heretofore and many novel features that result in a new Anti-Collision System which is not anticipated, rendered obvious, suggested, or even implied by any of the prior art vehicle anti-collision systems, either alone or in any combination thereof.

It is another object of the present invention to provide a new Anti-Collision System which may be easily and efficiently manufactured and marketed.

It is a further object of the present invention to provide a new Anti-Collision System which is of a durable and reliable construction.

An even further object of the present invention is to provide a new Anti-Collision System which is susceptible of a low cost of manufacture with regard to both materials and labor, and which accordingly is then susceptible of low prices of sale to the consuming public, thereby making such Anti-Collision System economically available to the buying public.

Still yet another object of the present invention is to provide a new Anti-Collision System which provides in the apparatuses and methods of the prior art some of the advantages thereof, while simultaneously overcoming some of the disadvantages normally associated therewith.

Still another object of the present invention is to provide a new Anti-Collision System for providing an audible warning to a vehicle operator indicating that the collision time to an obstacle located ahead of the vehicle is less than a pre-determined warning time and for providing a braking pressure to the vehicle's hydraulic fluid braking system upon the condition that the collision time is less than a pre-determined danger time and that the vehicle brake pressure is under a pre-determined brake pressure limit.

Yet another object of the present invention is to provide a new Anti-Collision System which includes a laser rangefinder mountable upon a front side of the vehicle for generating a first electronic signal, a self-speed determining means for generating a second electronic signal, a microcontroller for processing the first electronic signal to determine the distance between the vehicle and an obstacle located in front of the vehicle and for processing the second electronic signal to determine the self-speed of the vehicle, an alarm means functionally connected to the microcontroller for producing an alarm upon the receipt of an alarm signal from the microcontroller and a braking means functionally connected to the controller for applying a braking force to the vehicle upon the receipt of a braking signal from the microcontroller.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the location of the laser rangefinder, microcontroller housing and alarm housing according to the present invention.

FIG. 2 is a plan view showing a signal being transmitted and received by the laser rangefinder.

DESCRIPTION OF TILE PREFERRED EMBODIMENT

Figure 3:
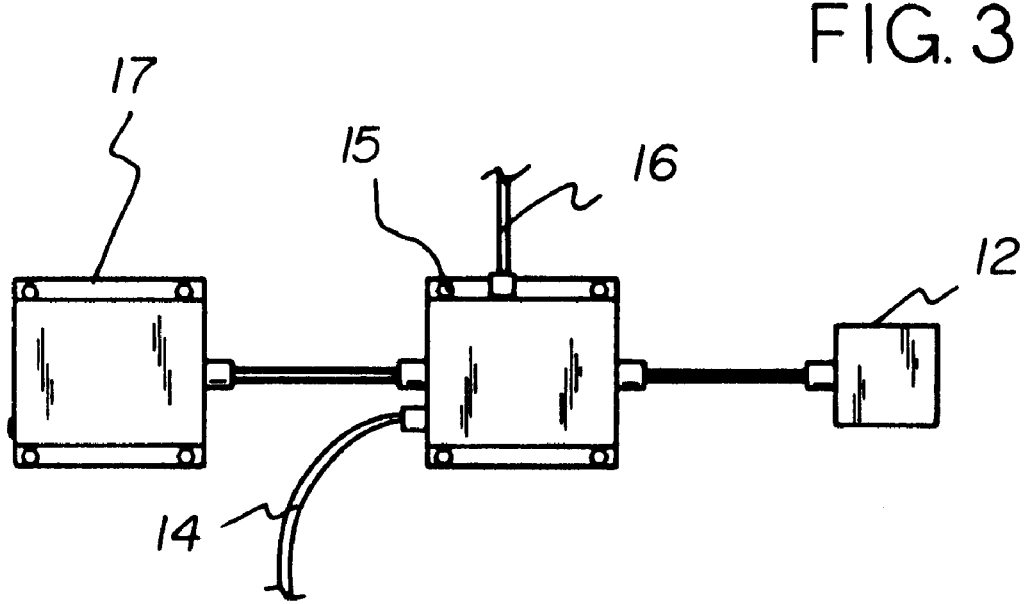
FIG. 3 plan view showing the electrical connections between the laser rangefinder, microcontroller housing and alarm housing.

With reference now to the drawings, and in particular to FIGS. 1 through 6 thereof, a new Anti-Collision System embodying the principles and concepts of the present invention and generally designated by the reference numeral 10 will be described.

More specifically, it will be noted that the Anti-Collision System 10 comprises a laser rangefinder 12 mountable upon a front side 13 of a vehicle 11. The laser rangefinder 12 includes a receiving means and a transmitting means (not shown). A self-speed determining means such as a digital speedometer (not shown) is also provided. A microcontroller housed in housing 15 is provided for performing processing functions as will be detailed hereinafter. An alarm means such as an audible alarm is functionally connected to the microcontroller for providing an alarm to the vehicle operator. A braking means functionally connected to the microcontroller is provided for applying a braking force to the vehicle upon the receipt of a braking signal from the microcontroller. reference to FIG. 1 the laser rangefinder 12 is shown mounted on the front side 13 of the vehicle 11. Also shown is the microcontroller housing 15 which houses the microcontroller. An alarm housing 17 is shown mounted in the interior 18 of the vehicle 11.

With reference to FIG. 2 an obstacle 19 such as a second vehicle is shown located in front of the vehicle 11 having the laser rangefinder 12 mounted thereon. The laser rangefinder 12 is shown receiving a signal which is reflected from the obstacle 19 after being transmitted by the laser rangefinder 12.

With reference to FIG. 3 the microcontroller housing 15 is shown including a power cord 16 for providing power to the microcontroller 32. Also shown is a signal cable 14 for functionally connecting the laser rangefinder 12, audible alarm 34, digital speedometer, pressure transducer 21 and solenoid driver 36 to the microcontroller (FIG. 4).

Figure 4:
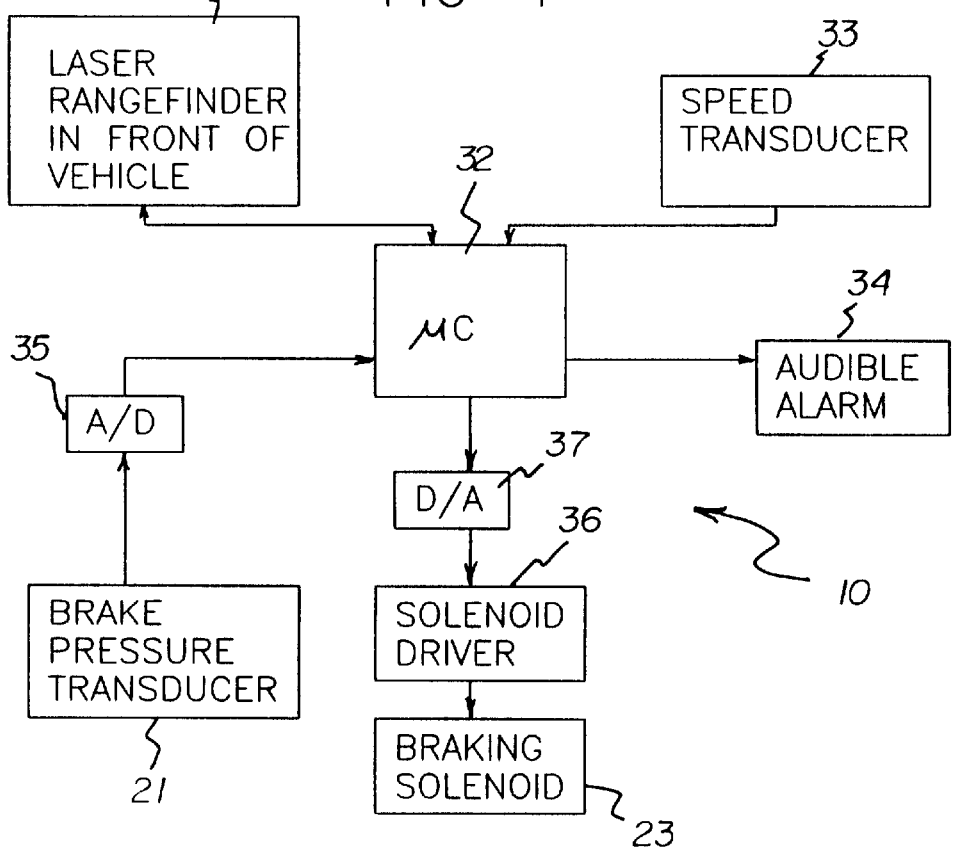
FIG. 4 is a schematic diagram of the invention.

With continued reference to FIG. 4 a brake pressure transducer 21 is shown providing an analog first brake pressure signal to an analog to digital converter 35 which provides a digital second brake pressure signal to the microcontroller 32 for processing. Also shown is a solenoid driver 36 such as a power amplifier for driving a solenoid 23. The solenoid driver 36 receives an analog braking signal from the digital to analog converter 37 which receives the braking signal from the microcontroller 32.

Figure 5:
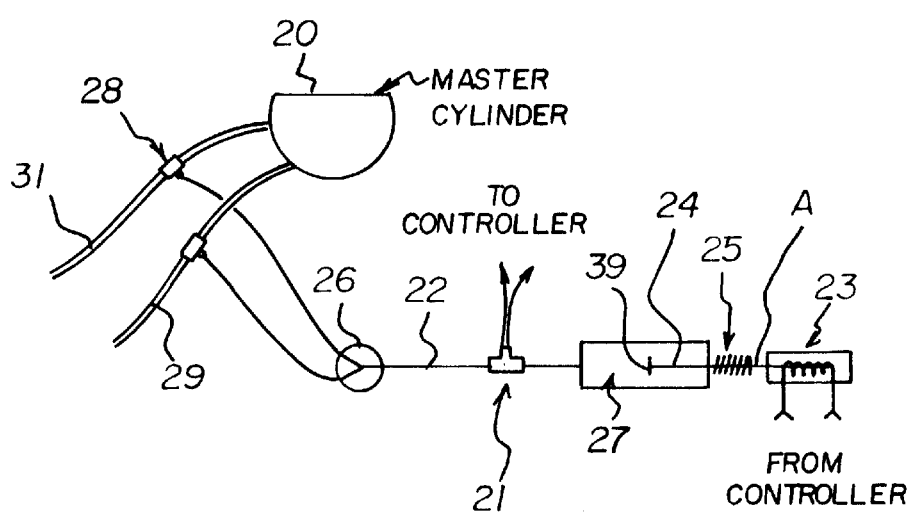
FIG. 5 is a schematic diagram showing the operation of the braking system.

With reference to FIG. 5 there is shown the braking system employed by the present invention. The solenoid 23 is driven by the solenoid driver 36. Current through the solenoid 23 drives the shaft 24, which also comprises a solenoid core, into a sealed hydraulic fluid reservoir 27. The shaft 24 is biased by means of spring 25 shown fixedly attached to the shaft at point A. A piston 39 is fixedly attached to the shaft 24 and is disposed slidably and sealingly within the reservoir 27. The reservoir 27 is in fluid flow communication with the vehicle's hydraulic fluid braking system by means of fluid line 22. A pressure transducer 21 is shown coupled to the vehicle's hydraulic fluid braking system for providing a first brake pressure signal representing the pressure existent in the vehicle's hydraulic fluid braking system to the analog to digital converter 35. A proportioning valve 26 is shown for proportioning the hydraulic fluid into the front brake line 31 by means of T coupling 28 and rear brake line 29 by means of T coupling 28. The front brake line 31 and rear brake line 29 are shown in fluid flow communication with the master cylinder 20.

Figure 6:
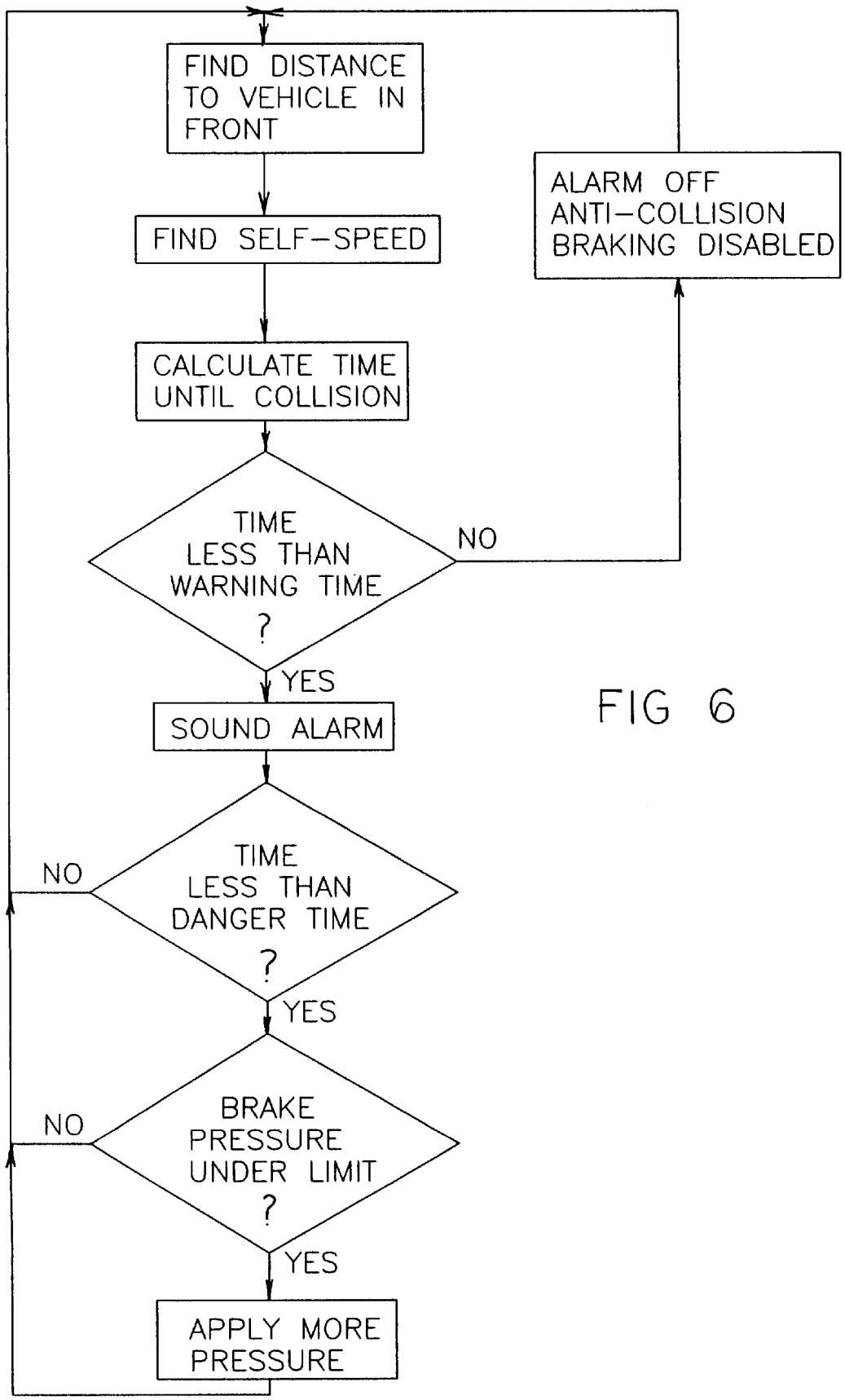
FIG. 6 is flow diagram illustrating the programming of the microcontroller.

With reference to FIG. 6 there is shown a flow diagram illustrating the programming of the microcontroller 32 as it is used to perform the processing functions of the present invention. The laser rangefinder 12 generates a first electronic signal which is processed by the microcontroller 32 into the distance between the vehicle 11 and the obstacle 19 located in front of the vehicle 11. The self-speed determining means generates a second electronic signal which is processed by the microcontroller 32 into the self-speed of the vehicle 11. A collision time is calculated by the microcontroller 32 by dividing the distance between the vehicle 11 and the obstacle 19. The collision time is compared to a hard wired warning time. If the collision time is less than the warning time, an alarm signal is sent to the alarm means which generates an alarm for alerting the vehicle operator. The collision time is then compared to a hard wired danger time. If the collision time is less than the danger time, the brake pressure is compared to a hard wired pressure limit and if the brake pressure is less than the brake pressure limit, a braking signal is sent to the solenoid driver 36 which drives the solenoid 23 to drive the piston 39 which exerts a force upon the hydraulic fluid disposed within the reservoir 27 which in turn exerts a pressure upon hydraulic fluid of the vehicle's hydraulic fluid braking system and thereby provides a braking force to the vehicle 11. The spring 25 exerts a restoring force upon the shaft 24 which tends to decrease the hydraulic pressure exerted upon the vehicle's hydraulic fluid braking system.

With continued reference FIG. 6 if the collision time is greater than the warning time, the distance between the vehicle 11 and the obstacle 19 is re-computed as is the self-speed of the vehicle 11 and the collision time. The collision time is then re-compared with the warning time and the computational cycle repeats itself. Additionally, if the collision time is greater than the danger time, the computational cycle is repeated. Finally, if the brake pressure is greater than the brake pressure limit, the computational cycle is repeated.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An Anti-Collision System for use with a vehicle having a hydraulic fluid braking system comprising:

a laser rangefinder mountable upon a front side of the vehicle for generating a first electronic signal;

a self-speed determining means for generating a second electronic signal;

a controller for processing the first electronic signal to determine the distance between the vehicle and an obstacle located in front of the vehicle and for processing the second electronic signal to determine the self-speed of the vehicle;

an alarm means functionally connected to the controller for producing an alarm upon the receipt of an alarm signal from the controller; and a braking means functionally connected to the controller for applying a braking force to the vehicle upon the receipt of a braking signal from the controller, the braking means further comprising a solenoid driver responsive to the braking signal, the solenoid driver being coupled to a solenoid, and a piston slidably and sealingly disposed within a sealed fluid reservoir in fluid flow communication with the vehicle's hydraulic fluid braking system, the piston being fixedly attached to a shaft, the shaft being spring biased against the sealed fluid reservoir and further comprising a solenoid core, the piston exerting a force upon a hydraulic fluid disposed within the sealed fluid reservoir upon the activation of the solenoid, the hydraulic fluid exerting a hydraulic pressure upon the vehicle's hydraulic fluid braking system.

2. The Anti-Collision System of claim 1, wherein the controller includes means for determining a collision time by dividing the distance between the vehicle and the obstacle by the self-speed of the vehicle.

3. The Anti-Collision System of claim 2, wherein the controller includes means for comparing the collision time to a pre-determined warning time and generating the alarm signal indicating that the collision time is less than the pre-determined warning time.

4. The Anti-Collision System of claim 2, wherein the controller includes means for comparing the collision time with a pre-determined danger time, means for comparing a vehicle brake pressure with a pre-determined brake pressure limit and means for generating the braking signal indicating that the collision time is less than the pre-determined danger time and that the vehicle brake pressure is less than the pre-determined brake pressure limit.

5. The Anti-Collision System of claim 1, wherein the self-speed determining means further comprise a digital speedometer.

6. The Anti-Collision System of claim 1, wherein the alarm means further comprise an audible alarm mounted in a vehicle interior.

7. The Anti-Collision System of claim 4, wherein the means for comparing the vehicle brake pressure with the pre-determined brake pressure limit further comprise a pressure transducer coupled to the vehicle's hydraulic fluid braking system for providing a first brake pressure signal, the first brake pressure signal being coupled to an analog to digital converter for providing a second brake pressure signal to the controller for processing to determine the brake pressure.

8. An Anti-Collision System for use with a vehicle having a hydraulic fluid braking system comprising:

a laser rangefinder mountable upon a front side of the vehicle for generating a first electronic signal;

a digital speedometer for generating a second electronic signal:

a controller for processing the first electronic signal to determine the distance between the vehicle and an obstacle located ahead of the vehicle and for processing the second electronic signal to determine the self-speed of the vehicle, the controller further comprising means for determining a collision time by dividing the distance between the vehicle and the obstacle by the self-speed of the vehicle, means for comparing the collision time to a pre-determined warning time and generating an alarm signal indicating that the collision time is less than the pre-determined warning time, means for comparing the collision time with a pre-determined danger time, means for comparing a vehicle brake pressure with a pre-determined brake pressure limit comprising a pressure transducer coupled to the vehicle's hydraulic fluid braking system for providing a first brake pressure signal, the first brake pressure signal being coupled to an analog to digital converter for providing a second brake pressure signal to the controller for processing to determine the brake pressure, and means for generating a braking signal indicating that the collision time is less than the pre-determined danger time and that the vehicle brake pressure is less than the pre-determined brake pressure limit;

an audible alarm mounted in a vehicle interior, the audible alarm being functionally connected to the controller for producing an alarm upon the receipt of the alarm signal from the controller;

a solenoid driver responsive to the braking signal, the solenoid driver being coupled to a solenoid; and a piston slidably and sealingly disposed within a sealed fluid reservoir in fluid flow communication with the vehicle's hydraulic fluid braking system, the piston being fixedly attached to a shaft, the shaft being spring biased against the scaled fluid reservoir and further comprising a solenoid core, the piston exerting a force upon a hydraulic fluid disposed within the scaled fluid reservoir upon the activation of the solenoid, the hydraulic fluid exerting a hydraulic pressure upon the vehicle's hydraulic fluid braking system.

* * * * *